United States Patent [19]

Sabatino

[11] 4,098,961

[45] Jul. 4, 1978

[54] WATER ACTIVATABLE, LEAD-ACID STORAGE BATTERY AND METHOD FOR MANUFACTURING SAME

[75] Inventor: Anthony Sabatino, St. Paul, Minn.

[73] Assignee: Gould Inc., Chicago, Ill.

[21] Appl. No.: 767,771

[22] Filed: Feb. 11, 1977

Related U.S. Application Data

[63] Continuation of Ser. No. 587,955, Jun. 18, 1975, abandoned, and a continuation-in-part of Ser. No. 486,661, Jul. 8, 1974, abandoned.

[51] Int. Cl.² .......................................... H01M 10/08
[52] U.S. Cl. .................................... 429/48; 429/118; 429/189; 29/623.1; 204/2.1
[58] Field of Search ........................ 429/48, 118, 189; 204/2.1; 29/623.1

[56] References Cited

U.S. PATENT DOCUMENTS

| | | | |
|---|---|---|---|
| 3,652,341 | 3/1972 | Halsall et al. | 204/2.1 |
| 3,733,220 | 5/1973 | Cortese et al. | 429/118 |
| 3,839,089 | 10/1974 | Duddy | 429/118 |

*Primary Examiner*—Donald L. Walton

*Attorney, Agent, or Firm*—Leydig, Voit, Osann, Mayer & Holt, Ltd.

[57] ABSTRACT

A method of manufacturing a lead-acid storage battery capable of being stored after completing the battery processing and thereafter activated by the addition of water including coordinating the formation and processing of the battery elements with a deep discharge to provide residual sulfuric acid electrolyte within the battery elements with a desired specific gravity level and thereafter reducing the amount of the electrolyte in the battery to thereby retain a specified level of residual sulfuric acid electrolyte within the elements of the thus-processed battery. The battery is suitably sealed and may thereafter be stored; and, when desired for service, activation is accomplished by addition of water and suitably charging. The sulfate in the battery elements resulting from the deep discharge and the residual sulfuric acid electrolyte retained within the elements combine, upon the addition of water and recharge, to yield the required specific gravity of the electrolyte. In a preferred embodiment, the battery is conditioned with a treating agent affording certain metallic sulfates to enhance the useful battery storage life and the ability of the battery to accept the required charge after water addition.

9 Claims, No Drawings

WATER ACTIVATABLE, LEAD-ACID STORAGE BATTERY AND METHOD FOR MANUFACTURING SAME

RELATED APPLICATIONS

This is a continuation of application Ser. No. 587,955 filed June 18, 1975 now abandoned.

Sabatino, Ser. No. 486,661, filed July 8, 1974, now abandoned for: A Water Activatable, Lead-Acid Storage Battery and Method of Manufacturing Same; the present application being a continuation-in-part thereof.

Mao and Sabatino, Ser. No. 377,525, filed July 9, 1973, now abandoned for: Method of Making a Lead-Acid Storage Battery, and the Battery Itself, Capable of Activation by the Addition of Electrolyte; and the continuation-in-part thereof, Ser. No. 486,663, now U.S. Pat. No. 3,948,680 filed July 8, 1974.

Sabatino and Rao, Ser. No. 377,563, filed July 8, 1973, now abandoned for: Battery Vent Seal; and the continuation-in-part thereof, filed on July 8, 1974.

Sabatino, Ser. No. 571,800, filed Apr. 25, 1975, now abandoned for: Water Activated Dry Charge Battery.

This invention relates to lead-acid storage batteries; and, more particularly, to a method for manufacturing such batteries which are capable of being stored and thereafter activated simply by the addition of water and charging, and to the resulting batteries themselves.

In recent years, considerable attention has been directed to dry charge batteries. This type of battery is formed, the formation electrolyte removed, the battery elements washed to remove any electrolyte residue, dried and then stored. It is ready for use merely by filing with electrolyte. The advantages are numerous; the cost of shipping such batteries is substantially less then "wet" batteries in which the electrolyte adds significantly to the weight of the battery. Also, shelf life is relatively long; and, accordingly, inventory control is facilitated.

For the most part, the prior techniques for removing the formation electrolyte have been directed to thoroughly washing and drying the battery elements after formation or charging so as to prevent the battery from losing its charge during storage. A more recent technique, shown in U.S. Pat. No. 3,652,341, discloses assembling the battery elements into the container and making the electrical connections, filling the battery cells with a forming electrolyte and then charging the battery elements. About 70 to 97 weight percent of the forming acid is then removed by applying an accelerative force, such as a centrifugal force, to the battery.

The thrust of these prior efforts is either that oxygen should not be utilized in contact with the formed plates or that, if it is utilized, the plates should be dried. It is further taught that the so-called dry charge batteries should be completely sealed. However, if any significant amount of residual electrolyte remains in the sealed batteries, there can be some internal generation of gases, such as hydrogen, caused by the self-discharge of the negative active materials during extended storage. This gas generation can cause bulging of the containers and, in some cases, ejection of the vent caps. To prevent this undesirable gas build-up, it has been suggested to introduce a controlled amount of oxygen into the vent ports of the battery prior to sealing and storage. The battery is thereafter sealed to prevent further ingress of air into the cell compartments during storage. It is hypothesized that the introduction of air prevents the undesirable pressure build-up caused by the generation of hydrogen by providing sufficient oxygen to cause certain reactions to take place at the negative plates which neutralize the limited amount of sulfuric acid present to a degree so that the reaction of lead and sulfuric acid to generate hydrogen is limited.

A particularly advantageous method for manufacturing dry charge-type batteries is described and claimed in the copending Mao and Sabatino applications identified hereinbefore. In this method, conditioning quantities of a treating agent affording certain metallic sulfates, or which react to afford such sulfates, is added to the formation electrolyte, a rinse electrolyte or to a separate solution in amounts of from about 0.05 to about 5.0 percent by weight of the solution or electrolyte. This addition obviates the necessity for removing, as by drying, all or substantially all of the electrolyte used to form the battery. Sufficient electrolyte is removed simply by draining, and the resulting battery can be stored for extended periods of time without significantly adversely affecting the performance of the activated battery. Depending upon the type and size of the battery, anywhere from about 15 to perhaps 60 percent of the electrolyte which is added during the overall formation and treatment process is retained in the battery during storage. From the economic standpoint, in this process, the use of sodium sulfate or zinc sulfate is preferred.

In all of these prior techniques, the emphasis is generally placed on limiting the extent of self discharge of the battery plates; and, in addition, the batteries are activated by the addition of sulfuric acid electrolyte.

A somewhat related development has been the effort to provide a water activated battery which in some embodiments contained little or no acid. For example, some prior efforts held acid in the battery, as an electrolyte precursor, either in a separate container or in a porous membrane. In either event, these prior batteries presented potential problems due to the presence of the extremely strong acid in the pack or the absorbent material.

A more recent technique for forming a water activated battery is shown in U.S. Pat. No. 3,733,220 to Cortese et al. In view of the fact that the discharged active material in both the positive and negative electrodes in lead-acid batteries comprises lead sulfate, it is stated that this suggests the possibility that a lead-acid type battery having dried electrodes and capable of being activated by the addition of only water could be produced by discharging the electrodes sufficiently after formation so that they and they alone contain sufficient lead sulfate to produce the required electrolyte upon the addition of water and charging. To achieve the necessary quantity of lead sulfate in the electrodes, it might be necessary to discharge the electrodes to a state of substantially complete discharge. However, when such a process was carried out, it was found that, after adding water and charging, the elements would not accept the charge. It was observed that crystals of grey material were being produced which extended from the negative electrodes through and/or over the separators to the positive strap connector. These crystals appeared very soon after water was added, and the attempt to charge was begun. Concurrently, it was observed that a thin film of white material was produced on the surfaces of the positive connecting straps. It was further observed that the elements would accept the charge if the grey crystals could be prevented from occurring.

According to the patentees, a combination of steps can be carried out to allow a lead-acid battery having dried, discharged electrodes to be charged after the addition of only water. The most important of these steps is to prevent the grey crystals and the white film from occurring. This is accomplished either by coating the exposed areas of elemental lead, and particularly the surfaces of the positive strap connectors, with a non-oxidizing material, or alternatively, by oxidizing those exposed areas of elemental lead with an oxidizing agent.

A further recent technique for forming a water activated lead-acid storage battery is shown in U.S. Pat. No. 3,839,089 to Duddy. As was discussed in the Cortese et al patent, Duddy found that attempts to activate a dry discharged battery by adding water and charging encountered unexpected problems. The characterization of the problem is identical to that set forth in the Cortese et al patent.

According to the Duddy patent, the dry formed positive and negative battery plates contain a small quantity of residual free sulfuric acid which tends to remain in the battery plates and to settle toward the bottom of the cell due to its greater specific gravity when compared to the adjacent water. The solution in the upper portion of the cell was found to be practically pure water, and it is theorized that the corrosion and dendrite growth described is caused by the effect of the charging current acting on lead parts in the presence of a neutral or possibly a basic electrolyte. In the Duddy solution, a minor portion of a dry, water soluble acid ion producing material is included within and in an upper portion of the cell. Suitable materials disclosed include the acid sulfates, acid sulfites and mono and di-hydrogen phosphates of alkali metals. Sodium acid sulfate monohydrate is stated to be the preferred material. The effect of these ions, it is stated, is to increase the acidity of the solution within the cells (when water is added) so that the lead parts are not soluble or subject to corrosive attack by the action of the electric current needed to charge the cell. The amount of the additive is selected so that it will provide from about 1 to 10 percent of the hydrogen ion needed in the cell. The remaining acid needed in the cell during service is provided by the decomposition of lead sulfate and the ionic action of water in the battery plates due to the action of the charging current along with any residual sulfuric acid which may be held within the pores of the discharged battery plates.

It is accordingly an object of the present invention to provide a simple, inexpensive method for making a lead-acid storage battery which is capable of being stored for extended periods of time and thereafter activated merely by the addition of water and charging.

Another object of this invention provides a method for making such batteries which obviates the necessity for applying any non-oxidizing coating to the battery elements or oxidizing all or part of the elements themselves.

Another object is to provide a method for making such batteries which greatly simplifies quality control.

A still further object of this invention is to provide such a battery which, after activation and recharge, possesses the requisite full charge specific gravity for the electrolyte.

Yet another object is to provide a water activatable, lead-acid type battery which eliminates the handling of acid electrolyte and the accompanying hazards associated therewith.

A further object lies in the provision of a method of making a water activatable, lead-acid battery wherein the step of drying the battery plates has been eliminated.

Other objects and advantages of the present invention will become apparent from the following detailed description.

While the invention is susceptible of various modifications and alternative forms, there will be herein described in detail the preferred embodiments. It is to be understood, however, that it is not intended to limit the invention to the specific forms disclosed. On the contrary, it is intended to cover all modifications and alternative forms falling within the spirit and scope of the invention as expressed in the appended claims.

In general, the present invention is predicated on the discovery that a water activatable, lead-acid battery which is capable of accepting the required charge after addition of water can be provided without the necessity of drying the battery elements and, either coating the exposed areas of elemental lead in the elements or oxidizing these exposed areas. By processing the battery so as to retain a specified level of residual sulfuric acid electrolyte within the battery elements, the thus-processed battery is capable of accepting the required charge after activation by water addition. The formation and processing of the battery are coordinated, as will be discussed in detail hereinafter, so that, after water addition and charging, an electrolyte with the desired specific gravity level at full charge condition is provided.

Turning now to a detailed description of the process of the present invention, and in accordance with one aspect of this invention, the formation and other processing steps incident thereto are coordinated to insure that, upon activation solely with water and charging, electrolyte is formed which possesses the desired specific gravity at full charge. To this end, and in accordance with the preferred embodiment of the present invention, the unformed, but fully assembled, battery is formed. This can be carried out by known formation techniques. For example, the concentration of the formation acid normally added will typically range from sulfuric acid solutions having a specific gravity of from about 1.020 to 1.100. Thereafter, currents are applied to the battery at levels and for times sufficient to provide the desired end-of-charge voltage. As a typical example, for lead-acid storage batteries for automotive purposes, the batteries may be charged using D. C. current with the current level used varying with the battery capacity (viz. - 53 Amp. Hr. - 7 Amps; 62 Amp. Hr. - 8 Amps). This may be continued, for example, for about 12 hours, after which the current level may be dropped, (53 Amp. Hr. - 4 Amps; 62 Amp. Hr. - 5 Amps). This reduced current level may be maintained for about 6 hours and forming may thereafter be completed by further reducing the current to about 3 Amps for a period of anywhere from about 1 to 3 hours.

After removing the excess formation electrolyte which is not held in the saturated battery elements, as by dumping, the battery is further processed to increase the specific gravity of the sulfuric acid electrolyte which is to be retained with the battery elements. To this end, a development electrolyte is added to the formed battery and allowed to saturate the battery elements. This can be accomplished by merely allowing the development electrolyte to stand in contact with the battery elements for about 10 minutes or even longer. Applying a mixing charge or boost is equally effective to allow the development electrolyte to diffuse in and saturate the battery elements.

The battery is then subjected to a deep discharge to convert at least a major portion of the active materials on the positive and negative plates to lead sulfate. The discharge may be complete, if desired. The extent to which the discharge is carried out is coordinated with the specific gravity of the development electrolyte used to allow development of the desired full charge specific gravity for the electrolyte after water addition and charging.

After the selection of the amount of discharge which is to be carried out, the specific gravity that should be used for the development electrolyte can be readily determined by taking into account the following parameters:

(1) the total electrolyte volume that can be added to the battery, (2) the total electrolyte volume that will be retained in the saturated battery elements upon draining the battery, (3) the end-of-formation specific gravity of the electrolyte retained in the battery elements, and (4) the desired full charge electrolyte specific gravity to be achieved after water addition and charging.

For example, in a plastic Group 24 automotive-type battery (81 Ampere Hour capacity), about 5160 c.c. of electrolyte can be added (860 c.c./cell) and 1500 c.c. of this electrolyte (250 c.c./cell) will be retained by the battery elements (when saturated). If a 1.060 formation acid was used (resulting in a 1.102 specific gravity acid being retained in the plates after completion of formation), a full charge specific gravity (after activation) of 1.265 is desired and a deep discharge is carried out to remove 80 Ampere Hours of capacity, the specific gravity needed for the development acid can be determined as follows:

Total $H_2SO_4$ (1.84 specific gravity) needed to achieve 1.265 specific gravity: 2323 (388 gms/cell or about 211 c.c./cell)

Amount of $H_2SO_4$ achieved from $PbSO_4$ (resulting from 80 Amp. Hr. discharge) after water addition and charging; 293 gms/cell (160 c.c./cell)

Amount of residual $H_2SO_4$ needed to be retained within battery elements (when saturated): 388 gms/cell - 293 gms/cell = 95 gms/cell (51 c.c./cell)

Amount of $H_2SO_4$ required prior to discharge = Amount needed for discharge + residual $H_2SO_4$ = 160 c.c./cell + 51 c.c./cell (5160/1500) = 336 c.c./cell ($H_2SO_4$ electrolyte of 1.405 specific gravity)

Amount of $H_2SO_4$ needed in development acid to achieve 1.405 gravity prior to deep discharge: Total Acid required - Amount retained from formation acid = 336 c.c./cell - 250 c.c./cell × 0.09 (strength of 1.102 acid) = 336 c.c./cell - 22.5 c.c./cell= 313.5 c.c/cell Strength of $H_2SO_4$ needed in development acid = 313.5 c.c./cell in 610 c.c./cell of solution can be added (viz. - 51.4% by volume $H_2SO_4$)

Development acid specific gravity which provides 51.4% by volume $H_2SO_4$: 1.521

After completion of the deep discharge, and in accordance with a primary aspect of this invention, the amount of the electrolyte in the battery is reduced so that a specified level of residual electrolyte is retained in the battery elements of the thus-formed battery. To this end, the amount of electrolyte is reduced to an amount in the range of from about 10% by volume (based upon the total volume of electrolyte capable of being added to the battery) to the amount retained by the battery elements when saturated. This amount of residual electrolyte is sufficient to leave the battery elements wet to the touch. It has been found that such wet battery elements allow the battery, after water addition following storage, to readily accept the required charge.

In a preferred embodiment, the amount of residual electrolyte is reduced only to the point where the battery elements are saturated; and this can be achieved merely by draining the batteries after completion of the deep discharge step, as by inverting the batteries.

If desired, however, the amount of residual electrolyte can be suitably reduced below the saturated level by centrifuging, partial drying, evacuation or the like. If the amount of residual electrolyte is so reduced, as will be appreciated, the specific gravity for the development acid to be added prior to deep discharge should be correspondingly varied to take into account this lesser amount of electrolyte that will be retained in the elements.

Completion of the processing involves suitably sealing the battery which may thereafter be stored until it is to be placed into service. Suitable sealing may be achieved merely by sealing the cover vent openings with closures preventing the ingress of air as is well known. However, while completely sealing the battery may be suitable, it will generally be desirable to only seal the battery sufficiently so that the ingress of air is just substantially prevented, permitting the gaseous atmosphere within the battery, after a slight pressure build-up, to be vented from the battery. A particularly desirable means of accomplishing the sealing so as to substantially prevent the ingress of air is described and claimed in the co-pending applications of Sabatino and Rao, entitled "Battery Vent Seal", assigned to the assignee of this invention, and referred to hereinbefore, wherein the seals for the battery vent openings are provided with a means communicating with the atmosphere such as circular apertures having diameters of from about 0.0005 to 0.006 inch.

While a preferred embodiment for providing the required specific gravity level for the residual sulfuric acid electrolyte retained in the battery during storage has been described, it should be appreciated that any formation and processing steps may be used so long as the appropriate specific gravity of the residual sulfuric acid is achieved which will provide the desired full charge gravities for service after activation with water and recharging. Thus, rather than employing a single development electrolyte step, multiple steps could be used. For example, after the formation step is completed and the formation electrolyte dumped from the formed battery, a development electrolyte of intermediate specific gravity (e.g. 1.265 or more) could be added; and a deep discharge carried out. Following dumping, a second development electrolyte of a somewhat higher specific gravity would then be added (e.g. 1.300 or more). Completion of the processing would then be carried out as hereinbefore described, viz. — reducing to an appropriate amount the residual sulfuric acid retained in the elements and then suitably sealing the battery.

Still further, and in accordance with another embodiment of the process of this invention, the formation, followed by a deep discharge as has been described herein, could be carried out in a formation electrolyte of either a low specific gravity or a high specific gravity (i.e. — a sulfuric acid electrolyte having a specific gravity of 1.150 or 1.200 or higher). The formation electrolyte is then dumped, and the specific gravity of the residual electrolyte is adjusted by the addition of a development electrolyte having the necessary specific gravity. The specific gravity for the development electrolyte can be selected by a consideration of the parameters discussed in connection with the preferred embodiment. Completion of the processing is then achieved as described herein.

Yet another process embodiment involves combining the formation step and development of the electrolyte specific gravity. In this embodiment, prior to assembly in the battery, the battery plates or elements are formed in a sufficiently high gravity electrolyte to provide the desired residual electrolyte specific gravity and are then subjected to a deep discharge (as has been described) in the formation electrolyte. Battery assembly and completion of the processing can then be carried out.

While an advantage of the present invention eliminates the need for removing residual electrolyte and drying the battery plates or elements, it should be appreciated that such steps can be carried out if desired. Thus, at any convenient intermediate point in the process, washing to remove electrolyte and drying can be employed. However, if this is done, the battery elements at the completion of processing must still contain the requisite residual electrolyte as described herein.

In all process embodiments, when any electrolyte addition is carried out, the processing should allow the electrolyte to fully diffuse into the battery elements as has been described. Also, the amount of residual electrolyte retained can be reduced by any of the techniques as has been described herein.

Accordingly, and as utilized in this specification and in the accompanying claims, the terminology "deep discharge" and "developing the specific gravity of the residual electrolyte retained in the battery elements" define a coordination of steps wherein the sulfate resulting from the level of discharge and the residual sulfuric acid electrolyte retained within the elements combine, upon the addition of water and suitable charging, to yield the required full charge specific gravity level for the electrolyte for intended service. Typically, this specific gravity, representing the state of full charge condition, prior to placing the battery in field service, will vary from about 1.220 to 1.290, depending upon the type of battery involved. For a typical automotive type battery, this specific gravity will vary from about 1.260 to 1.275, preferably about 1.265.

In accordance with a further and preferred aspect of the present invention, the battery is conditioned to enhance the useful battery storage life (i.e. — shelf life) and the ability of the battery to accept the required charge after water addition. To this end, a conditioning step is carried out by adding suitable quantities of a treating or conditioning agent (as hereinafter set forth) to any of the electrolytes used in the formation or other processing steps, or in a separate solution. Suitably, the treating or conditioning agent comprises a metallic sulfate or a compound affording the metallic sulfate upon reaction with the aqueous sulfuric acid solution which is utilized as the carrier for the agent. The treating agent should be added in an amount of from about 0.05 to about 5.0 percent (anhydrous metallic sulfate), based upon the weight of the carrier solution. As will be apparent, of course, the specific amount should be varied depending upon the stage in the process at which addition is carried out. For example, to insure that the battery will contain the requisite conditioning agent during storage, the diluting effect of electrolytes that will be added after the conditioning agent should be taken into account.

The conditioning agents which may be utilized comprise a metal sulfate or other metal compound which will yield the sulfate upon reaction in the solution and which metal sulfates or other compounds are: (1) sufficiently soluble in aqueous sulfuric acid solutions to provide the requisite conditioning quantities of the metal sulfate, (2) are not substantially harmful to either the battery components or to the performance of the battery in use (e.g. — not cause corrosion of the elements as would sodium acetate, gassing or the undesirable effects of the sulfates of iron, nickel, manganese, bismuth, platinum, mercury or chromium) and (3) not susceptible to produce a lead salt that would likely precipitate in sufficient amounts which would significantly reduce the porosity of the battery plates.

More particularly, the metallic sulfates of sodium (and its bisulfate), potassium, lithium, magnesium, cadmium, zinc, and aluminum have been found to be useful. While each of these materials have been found to be desirable to achieve the conditioning of the batteries in accordance with this invention, it should be appreciated that the advantages derived may vary somewhat depending on the specific material used and the amount employed. From the economic standpoint, sodium sulfate and also zinc sulfate are preferred. Other sulfates which could be employed include the sulfates of silver and cobalt. Still other sulfates that may be used are the following: $BeSO_4$, $Ce_2(SO_4)_2$, $In_2(SO_4)_3$, $La_2(SO_4)_3$, $SnSO_4$, $Tl_2SO_4$, $Zr(SO_4)_2$, and $Rb_2SO_4$.

Suitable metallic compounds which afford the metallic sulfates in an aqueous sulfuric acid solution and meet the criteria previously set forth include the corresponding hydroxides and oxides. For example, the addition of sodium hydroxide, potassium hydroxide and zinc oxide to form the metallic sulfate treating agent may be used.

In addition to these other metallic compounds, the hydrated sulfates (i.e. — having waters of crystallization associated therewith) may also be used. However, in either instance, the amount of the material used as the treating agent should be adjusted to provide an amount corresponding to the quantity required to afford in the carrier solution the amount of the metal resulting from the use of from about 0.05 to about 5.0 percent by weight of the anhydrous metallic sulfate.

If desired, mixtures of different materials can suitably comprise the treating agent. Moreover, while certain compounds have been described herein as being unsuitable to function as the treating agent, it should of course be appreciated that these unsuitable materials can be tolerated, within certain limits, so long as their undesirable effects are masked by the presence of the useful treating agent.

To achieve optimum results, the conditioning solution should be allowed to condition the battery plates so that diffusion into the wet battery plates and separators results. This conditioning can be accomplished, for example, by merely allowing the carrier solution to stand in contact with the plates for about 10 minutes or even longer. This soaking is effective to allow the treating agent solution to diffuse and mix with any residual electrolyte in the plates. Alternatively, the conditioning may be accomplished by mechanically mixing the carrier solution while it is in contact with the battery elements. Any conventional mechanical mixing means may be advantageously utilized.

After allowing sufficient time for the conditioning acid to diffuse into and saturate the plates and separators, a sufficient removal of excess solution is accomplished simply by draining the battery, viz. — by inverting the container and dumping. If desired, the amount of the retained electrolyte within the elements can be further reduced by centrifuging, partial drying, evacuation, or the like. Of course, and as has been described herein, the amount should not be reduced below about 10% by volume so that the battery elements will be wet to the touch. The thus-formed and conditioned battery may then be stored until necessary for use. Activation is completed, merely by adding water and then charging as is known. After completion of charging, the battery contains an electrolyte having an acceptable full charge gravity. Moreover, the battery is fully capable of accepting the required charge.

The following examples are illustrative, but not in limitation of the present invention. The high temperature storage carried out in the examples was used to simulate room temperature conditions that would occur over a longer period of time. The sodium sulfate used was anhydrous.

EXAMPLE 1

A Group 24 plastic battery (81 Amp. Hr. capacity) was conventionally formed in an electrolyte of 1.060 specific gravity. After dumping, a development acid of 1.451 specific gravity containing 0.5% by weight sodium sulfate was added and allowed to stand. The resulting electrolyte had a specific gravity of 1.358.

The battery was then discharged at 4.1 amps for 16.6 hours, at which time 68.0 Amp. Hr. capacity has been removed. After dumping the acid following completion of the discharge step, the battery was suitably sealed and stored at 110° F for 35 days.

After this time, water was added; and the battery was charged back at 6.0 amps with the charging being completed in 17 hours. Due to the rather incomplete discharge, the full charge gravity was 1.240. This could have been increased by extending the time involved in the discharge step or by using a higher gravity development acid.

The performance characteristics of the thus-charged battery were as follows:
First 25 Amp Reserve Capacity — 162.0 mins.
0° F Cold Performance — 450 Amp. discharge
5 Sec. Voltage — 7.93 volts
30 Sec. Voltage — 7.78 volts
Time to 7.2V — 91.0 seconds

EXAMPLE 2

A golf cart battery (220 Amp. Hr. capacity) was conventionally formed in an electrolyte of 1.060 specific gravity. After dumping, a development acid of 1.415 specific gravity containing 0.5% by weight sodium sulfate was added and allowed to stand.

The battery was then discharged to remove 156.0 Amp. Hrs. at a 25 Amp rate. After dumping the acid, the battery was suitably sealed and stored at 110° F for 75 days.

After this time, water was added; and the battery charged for 14 hours in a conventional golf cart charger. Due to the rather incomplete discharge, the full charge gravity was only 1.215. This could have been increased by extending the time involved in the discharge step or by using a higher gravity development acid.

The performance characteristics of the thus-charged battery were as follows:
1st 75 Amp. capacity — 97 minutes
2nd 75 Amp. capacity — 97 minutes

EXAMPLE 3

A series of 10 Group 27 plastic batteries (100 Amp. Hr. capacity based on 20 hr. rate) were conventionally formed in a sulfuric acid electrolyte of 1.060 specific gravity. After dumping to remove excess formation acid, a development acid of 1.555 specific gravity containing 0.4% by weight sodium sulfate was added and allowed to stand.

These batteries were then discharged at 5.0 amps with discharge being continued until 92 Amp. Hr. capacity (average of the series) had been removed. After completion of the discharge, the batteries were inverted to dump out the excess electrolyte of 1.236 specific gravity remaining after discharge. At this point, the battery elements retained, on the average, about 1900 cc. electrolyte per 6 cells out of a total of 6066 cc. electrolyte originally added. The vent openings were then sealed using vent seals in accordance with the Sabatino and Rao application identified herein.

After 78 days storage at 107°–110° F, five of the batteries were activated with water and charged using a commercially available battery charger. In 18 hours of charging, the batteries had accepted an average of about 128.0 Amp. Hr. capacity, which corresponds to 39% additional capacity over that which was removed during discharge. The average full charge gravity was about 1.255.

Following this chargeback, the batteries yielded an average of 90% of the rated peak capacity in the first discharge cycle. In subsequent cycling the batteries yielded the rated peak capacity.

The batteries were also subjected to a cycling test in which the batteries were discharged daily at 50 Amps to a cut-off voltage of 10.5 volts per battery. Following discharge, the batteries were charged back using the commerical 18 hr. charger. Each discharge and charge is considered as one cycle. Cycling is discontinued when the capacity falls to 50% of the peak capacity at 50 Amps discharge. About 126 cycles were completed, with the capacity in the discharge cycle still holding at the rated peak capacity of 78 minutes at 50 Amp discharge.

The other five batteries were activated, as described herein, after 125 days of storage. The average full charge gravity was 1.265. In the cycling tests previously described, the batteries have completed 33 cycles, with the capacity in the discharge cycle still holding at the rated peak capacity.

Thus, as has been seen, the present invention provides a truly water activatable, lead-acid battery which obviates the necessity for the inclusion of any sort of an acid pack in the battery prior to storage together with the attendant problems thereto. Merely by suitably adjusting the level of retained sulfuric acid electrolyte in the battery prior to storage, and preferably suitably conditioning the battery, the battery after water addition is provided with the ability to accept the required charge for activation. Still further, the depth of discharge and the residual sulfuric acid retained within the elements is suitably coordinated so that the desired full charge specific gravity level is achieved upon ultimate activation.

I claim as my invention:

1. A method of manufacturing a lead-acid storage battery including a container having a plurality of cell compartments and a plurality of battery elements consisting of a plurality of positive and negative plates with separators positioned therebetween, the battery elements being electrically connected, to provide a battery capable of being stored and thereafter activated, by the addition of water and charging, which comprises forming said plates by bringing said plates into contact with a formation electrolyte and applying current thereto, draining the formation electrolyte from the battery, bringing said plates into contact with a development electrolyte to increase the specific gravity of the residual electrolyte retained in the battery elements, deep discharging the battery plates, reducing the amount of electrolyte in the battery to an amount in the range of from about 10% by volume of the total electrolyte capable of being added to the battery to the amount of electrolyte retained by the saturated battery elements, the amount of sulfate resulting from the deep discharge and the residual sulfuric acid electrolyte retained within the battery elements combining, upon the addition of water and charging, to yield an end-of-charge electrolyte having an acceptable specific gravity, and sealing the battery.

2. The method of claim 1 wherein the amount of electrolyte in the battery, after deep discharging, is reduced to the amount retained by the saturated battery elements.

3. The method of claim 1 wherein the amount of electrolyte retained in the battery, after deep discharging, is reduced to an amount below the amount retained by the saturated battery elements by centrifuging.

4. The method of claim 1 wherein the battery plates are brought into contact with a conditioning amount of metallic sulfate.

5. The method of claim 4 wherein the metallic sulfate is sodium sulfate.

6. The method of claim 4 wherein the metallic sulfate is added to the development electrolyte.

7. A method of manufacturing a lead-acid storage battery including a container having a plurality of cell compartments and a plurality of battery elements consisting of a plurality of positive and negative plates with separators positioned therebetween, the battery elements being electrically connected, to provide a battery capable of being stored and thereafter activated, by the addition of water and charging, which comprises forming said plates by bringing said plates into contact with a formation electrolyte and applying current thereto, deep discharging the battery plates, bringing said plates into contact with a development electrolyte to increase the specific gravity of the residual electrolyte retained in the battery elements, reducing the amount of electrolyte in the battery to an amount in the range of from about 10% by volume of the total electrolyte capable of being added to the battery to the amount of electrolyte retained by the saturated battery elements, the amount of sulfate resulting from the deep discharge and the residual sulfuric acid electrolyte retained within the battery elements combining, upon the addition of water and charging, to yield an end-of-charge electrolyte having an acceptable specific gravity, and sealing the battery.

8. The method of claim 7 wherein the formation electrolyte is a low specific gravity aqueous sulfuric acid solution.

9. The method of claim 7 wherein the formation electrolyte is a high specific gravity aqueous sulfuric acid solution.

* * * * *